Figure 7:
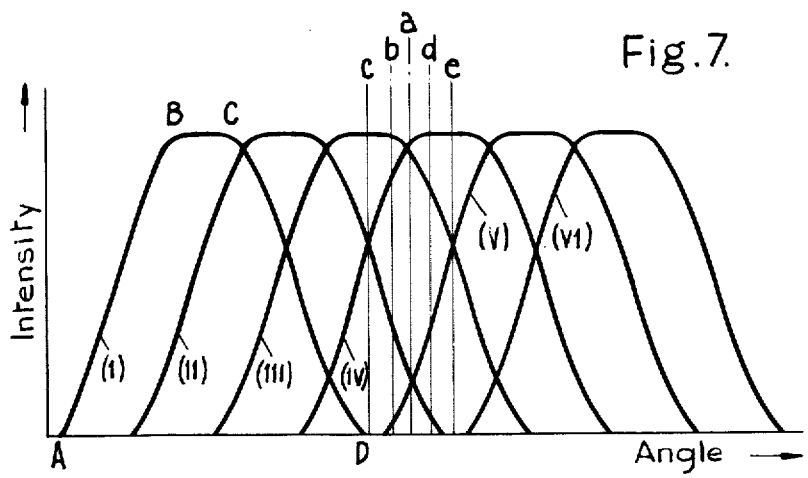

March 14, 1961 H. M. FERGUSON ET AL 2,975,400
VISUAL POSITION-INDICATING ARRANGEMENTS
Filed Dec. 12, 1958 6 Sheets-Sheet 1
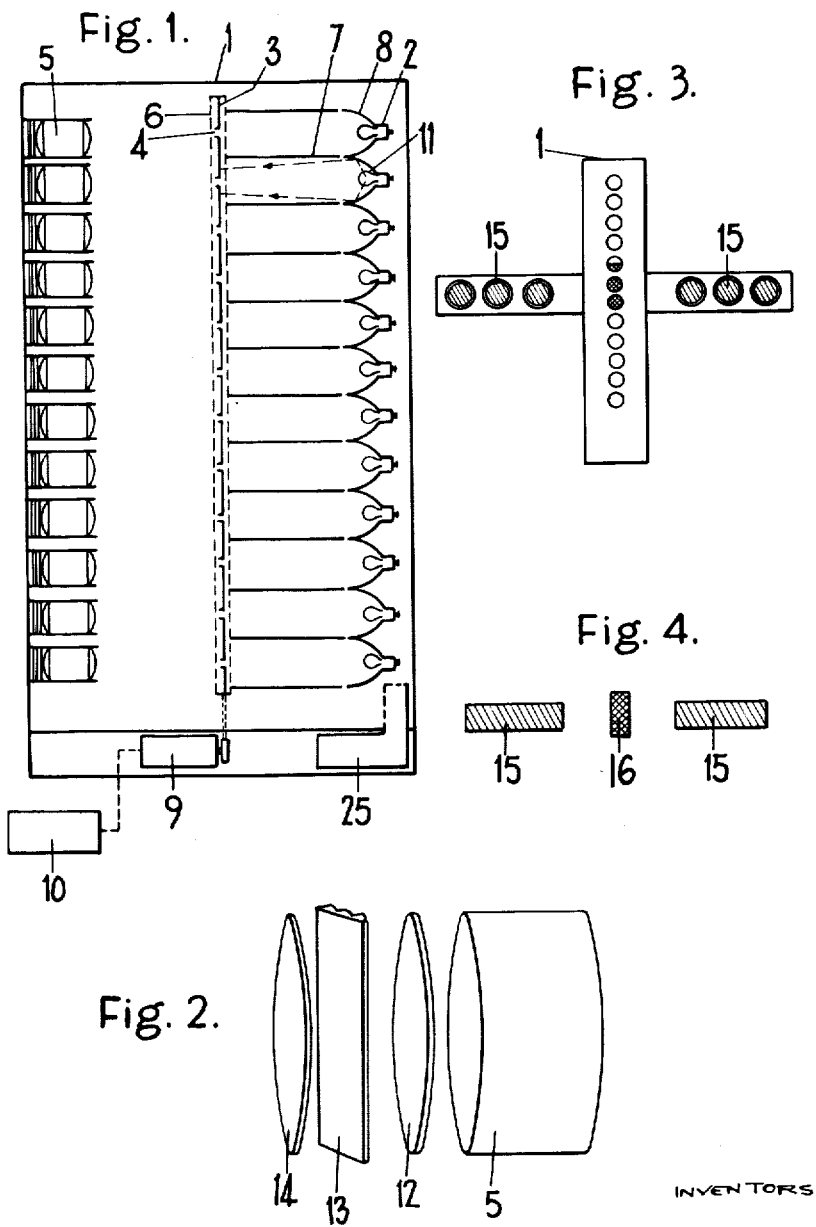

March 14, 1961  H. M. FERGUSON ET AL  2,975,400
VISUAL POSITION-INDICATING ARRANGEMENTS
Filed Dec. 12, 1958  6 Sheets-Sheet 2
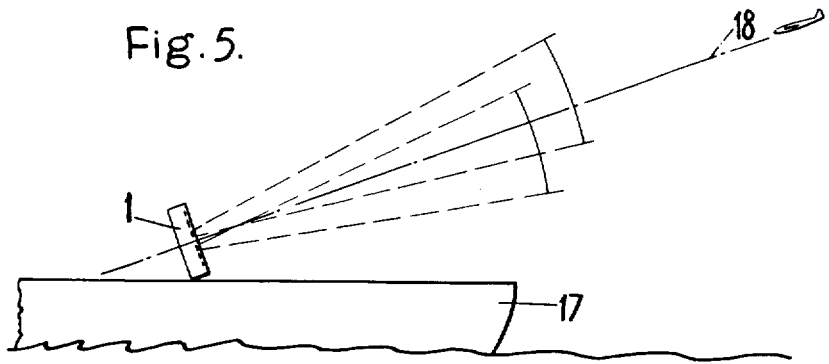
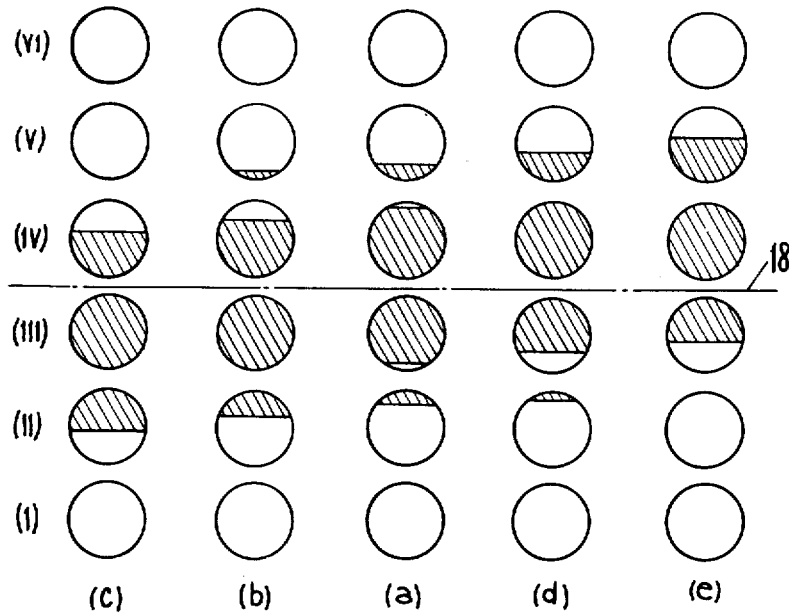

March 14, 1961 H. M. FERGUSON ET AL 2,975,400
VISUAL POSITION-INDICATING ARRANGEMENTS
Filed Dec. 12, 1958 6 Sheets-Sheet 4

INVENTORS
HAROLD MATTHEW FERGUSON
WALTER ROBERT STEVENS
ALAN JOHN ALFRED SAGAR
BY
Kirschstein, Kirschstein & Ottinger
ATTORNEYS

United States Patent Office 2,975,400
Patented Mar. 14, 1961

2,975,400

VISUAL POSITION-INDICATING ARRANGEMENTS

Harold Matthew Ferguson, Hatch End, Walter Robert Stevens, Pinner Hill, and Alan John Alfred Sagar, St. Albans, England, assignors to The General Electric Company Limited, London, England Filed Dec. 12, 1958, Ser. No. 779,951

Claims priority, application Great Britain Dec. 20, 1957

10 Claims. (Cl. 340—26)

This invention relates to arrangements for providing an observer approaching a location with a visual indication of his angular position with respect to the location relatively to a particular plane, hereinafter referred to as the approach plane, passing through the location. The approach plane may, for example, be a vertical plane or in the case where the location is a landing ground and the observer the pilot of an aircraft approaching the landing ground, the approach plane may be inclined to the vertical so as to define a correct angle of descent to the ground for landing the aircraft on a runway. In some cases more than one approach plane each provided with its own visual indicating arrangement may be associated with the same location, for example in the case of an airfield one approach plane may be a vertical plane extending along the centre of a runway for guiding an approaching aircraft into line with the runway, and another approach plane may be a plane inclined to the vertical for guiding the aircraft down on to the runway. The invention is especially, though not exclusively, concerned with visual indicating arrangements of the latter kind for guiding aircraft along the correct angle of descent on to the deck of an aircraft carrier, for which purpose it is essential that the indication provided by the visual indicating arrangement be sensitive and quickly interpretable by the pilot of an approaching aircraft.

In the specification of British Patent No. 793,868, which was published on the 23rd April, 1958 and is assigned to the same assignee as the present application, there is described an arrangement for providing an observer approaching a location with a visual indication of his angular position with respect to the location relatively to an approach plane passing through the location, which comprises a plurality of light sources extending on both sides of the approach plane along a line transverse to the approach plane, said light sources being arranged to project towards the observer light beams which are of narrow and sharply defined beam angle in planes perpendicular to the approach plane, which lie side-by-side in said perpendicular planes on one or other side of the approach plane according to and in the same sequence as the arrangement of the light sources along said line so as to be directed away from the approach plane with the exception of one beam which contains the approach plane or of two adjacent beams which flank the approach plane, and a marker visible to an observer over the whole of the space within which the indication is required to be provided which is associated with the light sources so that the position relatively to the marker of the light source seen by the observer provides the required visual indication.

The marker preferably marks the intersection of the approach plane with said line so that coincidence with the marker of the light source seen by the observer indicates that the observer is in the approach plane within narrow predetermined limits. The marker can conveniently consist of a line of lights extending perpendicular to and preferably on both sides of the said line of light sources, which latter line is preferably substantially perpendicular to the approach plane, although in the case of an angle of approach indiactor for a land aerodrome it will usually be necessary for the light sources and marker lights to be flush with the ground to avoid obstructions in or near the runway.

The extent of the individual light beams in planes parallel to the approach plane will depend on the angle in such planes within which the required indication is to be given and will in general be much greater than the beam angle in planes perpendicular to the approach plane, so that the beams are effectively of fan shape.

It will be understood that hereinafter, unless otherwise stated, the references to beam angles and to the sides of the beams will mean the relatively narrow beam angles in planes perpendicular to the approach plane and the sides of the beam bounding these relatively narrow angles.

An object of the present invention is to provide an improved form of the position indicating arrangement described in British patent specification No. 793,868, and a particular object is to provide an improved arrangement that is especially suitable for use as a deck-landing aid in naval aircraft carriers.

Figure 9:
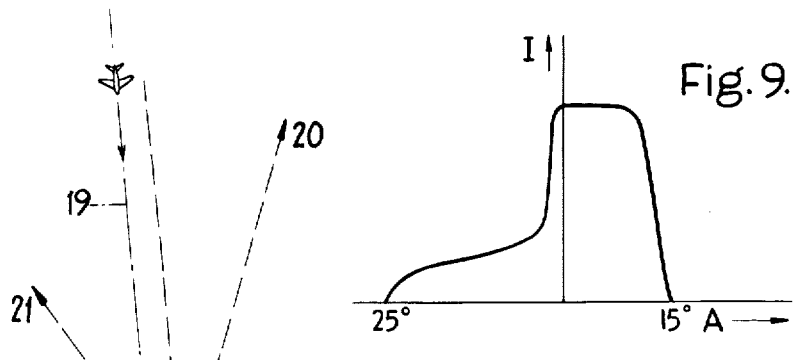
Figure 10:
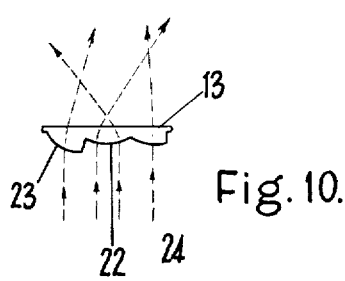
Figures 11, 12:
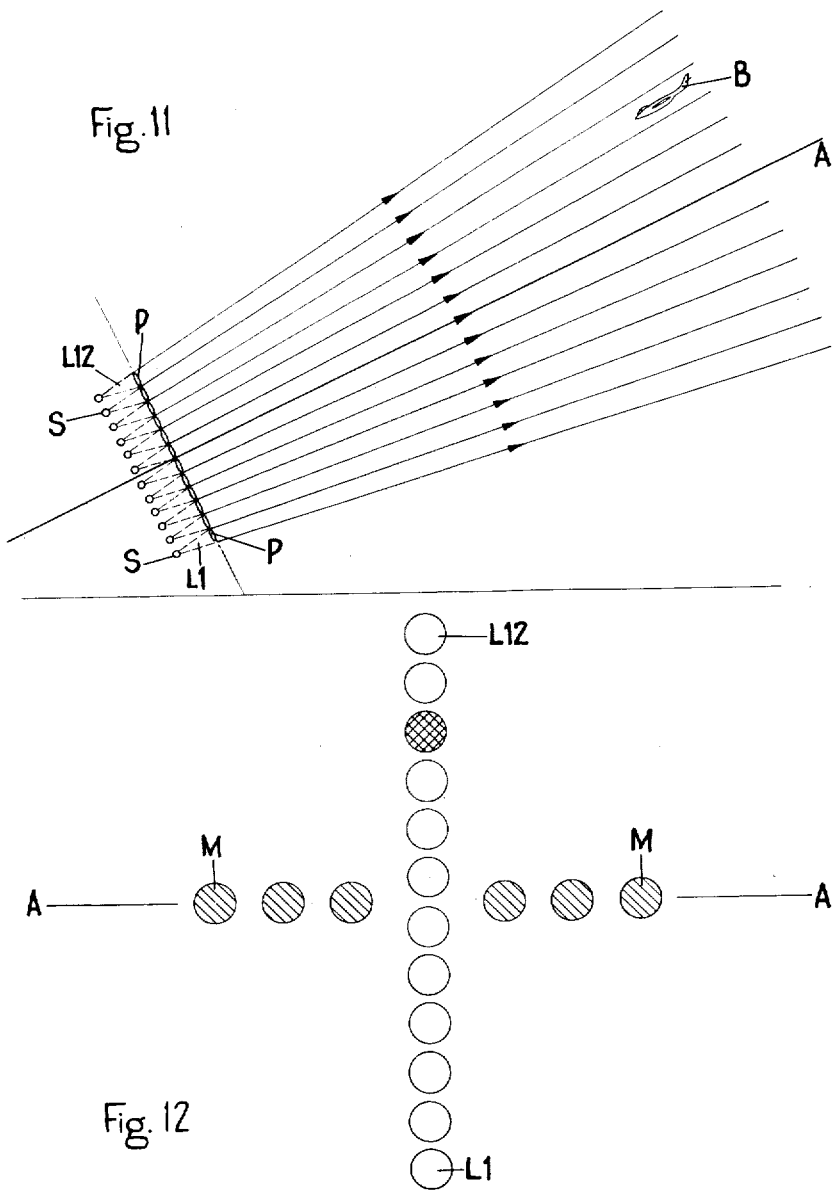
Figure 13:
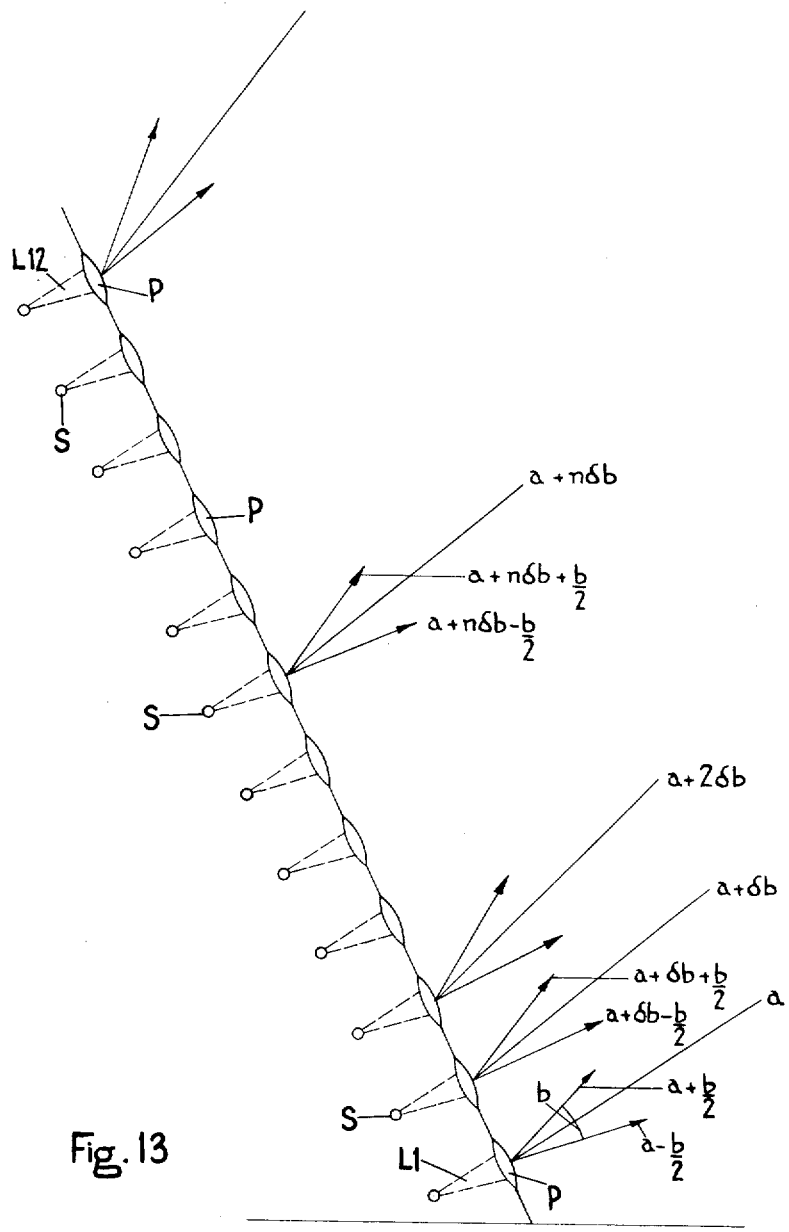
Figure 14:
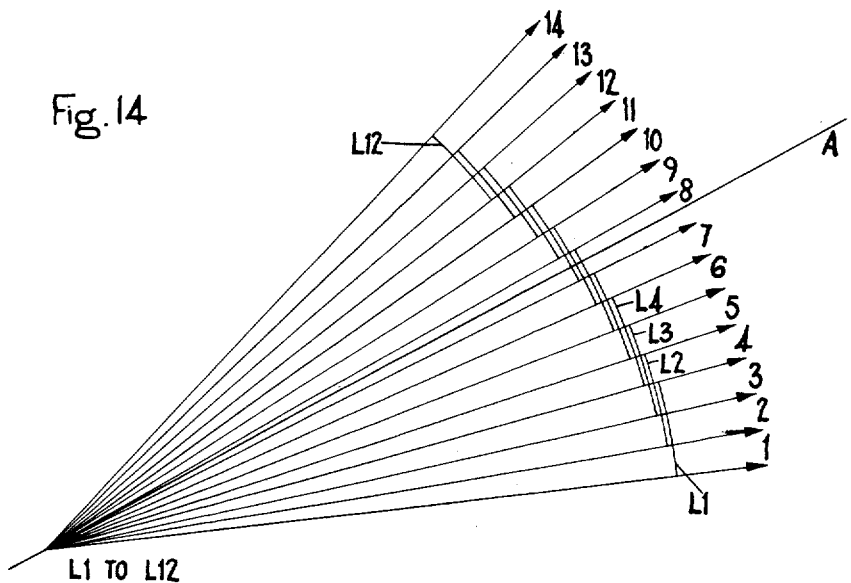
Figure 15:
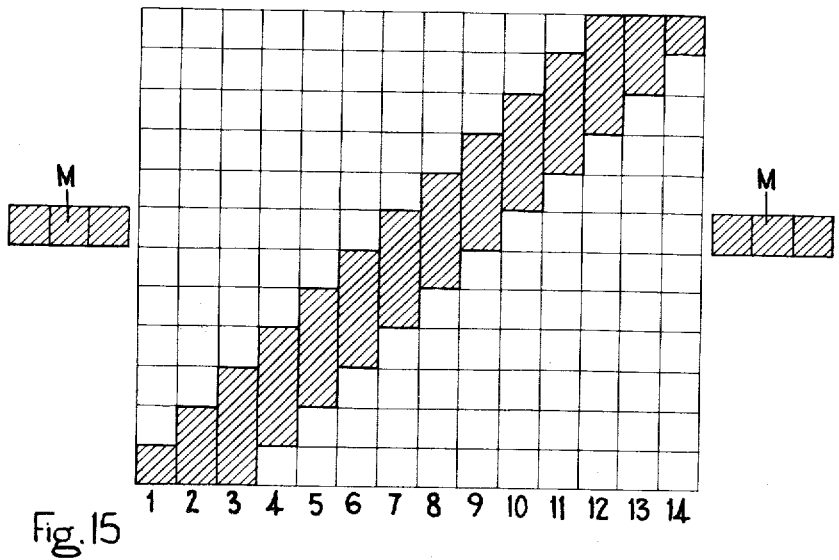

The invention will be further described with reference to the accompanying schematic drawings in which Figure 1 shows a side view and Figure 3 a front view of a particular embodiment of the invention, Figures 2 and 10 illustrate details of this embodiment, Figures 4 to 9 are diagrams explanatory of the operation of the embodiment, Figure 11 represents a vertical section through an arrangement which is not in accordance with the present invention but is in accordance with the invention described in British patent specification No. 793,868, Figure 12 represents a view of the Figure 11 arrangement as seen by an observer approaching the arrangement from one side of the approach plane, Figure 13 represents a vertical section through the improved arrangement of the invention corresponding to Figure 11, and Figures 14 and 15 are explanatary of the operation of the arrangement shown in Figure 13.

Referring first to Figure 11, the arrangement therein shown includes twelve optical projectors L1 to L12 arranged in sequence along a line transverse to an approach plane A which is inclined at a small angle to the horizontal and defines the correct angle of descent for an aircraft B approaching the location. The projectors, illustrated as light sources S co-operating with projection lens systems P, are arranged to project sharply defined light beams which are of narrow vertical beam angle and lie side-by-side in vertical planes, one half of the total number of beams being directed above, and the other half below, the approach plane at progressively increasing angles thereto.

The line of intersection of the approach plane A with the line sequence of light sources provided by the projectors is marked by three marker lights M on each side of the line sequence as shown in Figure 12, these marker lights providing beams which extend vertically over the whole range of the beams provided by the projectors L1 to L12 so as to be continually visible to an observer in the aircraft B everywhere within the working region of the arrangement. According to his position above or below the approach plane the observer also sees one or the other of the light sources L1 to L12 illuminated, and the position of this light source above or below the marker lights M tells him the position of the aircraft above or below the approach plane, the visible lights being indicated by shading in Figure 12 for the position of the aircraft indicated in Figure 11. As the aircraft moves across the paths of the beams so as to come nearer to the approach plane the observed spot of light moves nearer to the marker lights, and the task of the pilot is to so position his aircraft as to bring the observed spot of light into line with marker lights and to hold it in that position, this ensuring landing along the correct angle of descent.

It will be appreciated that the marker need not necessarily consist of lights and need not necessarily be provided at the centre of the line sequence of light sources, although this will usually be preferable. All that is required is that the marker should be clearly visible to the observer and that he should be able to bring the observed spot of light into some readily recognisable position with respect to it for securing the correct positioning of the aircraft.

In arrangements of the kind just described, and comparable arrangements using side-by-side beams of light, it has hitherto been considered essential to obtain as sharp a cut-off as possible in the light intensity at the adjacent sides of the beams, so as to reduce to a minimum the slight overlap of the beams which inevitably occurs in practice. Such overlap, which in the Figure 11 arrangement results in two of the light sources L1 to L12 being seen simultaneously for a short time as the aircraft passes from the region of one light beam into the region of another, has hitherto been regarded as a disadvantage to be avoided, but we have now appreciated that it can be turned to an advantage by deliberately exaggerating it so as to render at least two of the light sources visible to the observer at any position within the greater part of the working region of the arrangement, thereby greatly improving the visual range of the arrangement. Other advantages can also be secured, as will hereinafter be described.

Briefly stated, the invention in its simplest form consists in causing the light beams in an arrangement such as Figure 11 deliberately to overlap in planes perpendicular to the approach plane so that, starting from one end of the line sequence of light sources, each light beam except the last overlaps at least half but not the whole of the next light beam in the sequence, and possibly also a part of one or more of the following light beams in the sequence. In this way it is ensured that, except at the extreme upper and lower sides of the working region, always two or more adjacent light sources are seen and form in effect a single compound light source whose centre changes in position relatively to the marker with changes in the position of the observer relatively to the approach plane.

The arrangement is illustrated schematically in Figure 13, which shows the twelve light sources L1 to L12 and the relationship of the light beams produced thereby, but since it is difficult to demonstrate the overlap of the light beams in a drawing restricted to the region adjacent to the light sources, Figure 14 has been included showing how the light beams overlap at a distance such that they can be regarded as originating from a single point well behind the sources.

Referring first to Figure 13, if the beam angle for all the light beams is $b$ and the lowermost light beam has its centre line directed at an angle $a$ to the horizontal, so that its sides are nominally at angles $(a-b/2)$ and $(a+b/2)$ to the horizontal, the invention consists, in one form, in giving the successive centre lines angular displacements $\delta b$ from the direction of the previous centre line where $\delta$ is a fraction not greater than ½. The sides of the $n$'th light beam from the first will then be at angles $(a+n\delta b+b/2)$ and $(a+n\delta b-b/2)$ to the horizontal and the number of beam overlaps i.e. the number of light sources seen by the observer, within the central and greater part of the working region of the arrangement, will (assuming infinitely sharp beam cut-off) be $1/\delta$ or will vary in succession between the integers on either side of $1/\delta$ if the latter is not integral.

Whilst an arrangement with $1/\delta$ nonintegral might be suitable for some purposes, since the position of the centre of the compound light source formed will change relatively to the markers in the desired manner, the successive increase and decrease by unity in the number of light sources seen will introduce a jerkiness into the indication given which might be undesirable. This jerkiness can be avoided by making $1/\delta$ integral and Figure 14 shows the nature of the overlap of the light beams for the case where $1/\delta$ is 3.

The twelve light beams, indicated by the short connecting arcs labelled L1, L2, etc., are such that each overlaps two-thirds of the next and one-third of the next but one beam in the line sequence and together they define fourteen distinct angular divisions of the working region numbered 1 to 14 for which the visual indications provided by the light sources, relatively to the markers M, are illustrated side-by-side in Figure 15.

It will be seen that over the greater part of the working region, from position 3 to 12, three light sources together are always seen, giving three times the light intensity of an arrangement in which only a single light source at a time is seen.

The task for the pilot, with the approach plane A in the direction shown in Figure 14, is to bring his aircraft into position 8 in which the compound light source seen is centred between the markers M.

Referring back to the Figure 13 arrangement, it will be appreciated that the beam angles and the angular deviations from one to the next of the beam centre lines need not necessarily be constant and it might in fact be preferable to make the beam angles and deviations smaller for the beams nearer the approach plane for enhancing the sensitivity of the arrangement in this region.

It will also be appreciated that since it is not possible in practice to obtain a perfectly sharp cut-off at the sides of the beams, the number of light sources seen in an arrangement of the kind just described will momentarily change by one at each change from one position to the next, but the transition can be made so sharp that the effect can be ignored in many cases. It can be minimized by using a large number of light sources and arranging for a correspondingly large number of them to be visible at any time. The more light sources rendered visible together, the greater will be the visual range of the arrangement, for a given size of source, but the less will be the sensitivity, and the choice in any particular case of the number of light sources to be rendered visible out of the total number available will be a matter of choosing the best compromise between these two requirements.

Apart from the jerkiness in the apparent movement of the observed spot of light caused by such momentary increases in the number of light sources visible, there is also a corresponding fluctuation in the apparent brightness of the observed spot of light, and this is liable to be more disturbing than the jerkiness of movement.

A substantially constant apparent brightness can, however, be obtained by arranging that the light beams are formed as the projection by large aperture lenses of light beams forming virtual images of narrow band light sources, such as illuminated slits, each extending parallel to the approach plane and arranged between the corresponding projection lens and its focus so that towards the sides of the projected beam the edge of the virtual image becomes visible and a progressively increasing or decreasing area of the lens appears to be flashed according as the observer is moving towards or away from the centre plane of the beam. In this way it can be arranged that at transition regions of the overlapping beams a decrease in the flashed area of one lens is accompanied by an increase in the flashed area of the lens at the other end of the compound light source so that the resultant intensity of the light reaching the observer remains substantially constant. In some cases there might be a slight variation in the actual length of the compound light source but such variations are less apparent than variations in intensity and will usually be negligible or tolerable.

The use of illuminated slits and projection lenses for forming the light beams has a particular advantage for use in guiding aircraft along the correct angle of descent for landing on naval aircraft carriers in that it lends itself readily to manual or automatic stabilisation of the arrangement against pitching of the carrier, so that the guiding array of light beams and the approach plane defined by it remain substantially fixed in elevation relative to the true horizontal despite such pitching. It will be understood that here and hereinafter the term pitching refers to pitching along the line of landing approach of the aircraft which in the case of aircraft carriers having an angled deck is inclined to the centre line of the vessel so that the roll component as well as the fore and aft component of vertical angular movement must be taken into account for stabilising purposes.

Such illuminated slits and projection lenses can, of course, be used in arrangements of the kind described with reference to Figure 13, the slits then being placed at the foci of the lens systems P and producing virtual images at infinity, so that in any form of arrangement in accordance with the invention designed for use as an angle of approach indicator for the deck landing of aircraft on an aircraft carrier, each light source can be provided by an opaque sheet carrying a narrow slit elongated in a direction parallel to the intended approach plane, together with a condenser system on one side of the sheet arranged for illuminating the slit and an appreciable area of the sheet on each side of the slit, transverse to its length, with light, and a projection lens system on the other side of the sheet arranged with the slit lying either at its focus, or between the lens system and the focus for projecting a said beam of light forming a virtual image of the slit, said opaque sheets being mounted on a common carrier arranged for movement in the direction transverse to the length of the slits, and a control means can be provided for enabling the position of the common carrier, and with it the positions of the sheets and slits, to be adjusted in response to pitching of the aircraft carrier in use of the arrangement so as to maintain the direction of the array of light beams substantially constant in the vertical plane of landing of the aircraft.

Preferably the control means is arranged to be operated automatically by a stabiliser itself automatically responsive to the pitching of the carrier. For example the slits for the different light sources may all be formed at different regions of a single sheet slidably mounted between guides and geared to an electric motor which is arranged to be automatically controlled by a gyroscopic stabiliser.

Usually it will only be necessary to provide for stabilisation against pitching of the aircraft carrier through an angle of a few degrees, for example up to plus or minus five degrees.

It is to be observed that it will not, in general, be necessary to provide for stabilisation of the marker, since this is arranged to be visible over the whole operative region of the arrangement and can readily be arranged to remain visible despite pitching of the carrier.

One particular embodiment of the invention will now be described by way of example with reference to Figures 1 to 10 of the accompanying schematic drawings. This embodiment is intended for use in guiding aircraft along the correct angle of descent to the deck of an aircraft carrier and is provided with means for projecting twelve beams of light which overlap in a manner hereafter to be described.

Referring now to Figure 1, the means for producing the light beams are mounted within a housing 1 and each consists of a reflector condenser system 2, an opaque sheet 3 carrying a narrow elongated slit 4, and a projection lens system 5, the different means being mounted immediately above each other within the housing with the opaque sheets fitting in a common carrier, indicated by the dotted lines 6. If necessary heat shields 7 can be arranged between the carrier and the individual elliptical reflectors 8 of the condenser systems as shown, although if a fan such as that indicated by 25 is included, these might be omitted in some cases.

The common carrier 6 is supported between side guides (not shown) and is linked with an electric motor 9 by means of which it can be driven in either direction along the guides in response to the action of an automatic stabiliser 10 on the electric motor. The stabiliser 10 may be of known kind automatically responsive to pitching of the carrier to operate switches controlling the motor 9.

Each reflector condenser system includes means for mounting a filament lamp 11 with its filament accurately positioned relatively to the reflector (preferably with the aid of prefocussing arrangements) for illuminating the corresponding slit and the regions on each side of the slit through which the slit might move during the stabilising action of the sheet carrier 6, as indicated by the dotted lines for the lamp-referenced 11 in Figure 1.

Each projection system 5 includes a compound lens arrangement of large aperture, for example about four inches in diameter and focal length about fourteen inches, positioned so that the corresponding slit 4 is about 4.5 millimetres from the focus towards the lens. Over the front of each lens is placed an amber filter 12, a light spreader 13 (which will be further described later) and a protective cover 14 of armour plate glass, as indicated in exploded perspective in Figure 2.

The slits are about 0.076 inch in height and the lenses are arranged to produce light beams of angular width vertically of about 30 minutes and, starting from the lowermost, with a progressive upward shift of about 8 minutes in the directions of the central planes of the beams.

The housing is arranged so that the light beams from the central two lenses extend symmetrically on each side of the approach plane, which will usually be at an angle of about 3° to the horizontal. The intersection of the approach plane with the line of lenses is marked by two rows of lights 15 carried by the housing and extending transverse to the line of lenses, one on each side thereof as indicated in Figure 3, which shows a schematic front view of the housing. Preferably the marker lights are coloured green and the lenses covered by an amber filter, as already mentioned, so that the indication provided thereby is coloured amber and contrasts readily with the marker lights.

This indication consists, within an angular zone of about 45 minutes on each side of the approach plane, of an apparent illumination of about two and one half of the lenses (as indicated in Figure 3) these effectively merging to form a single spot of light over at least the greater part of the normal approach distance within which the indication is required, as indicated at 16 in Figure 4. When the observer is in the approach plane, this spot of light 16 is centred between the marker lights 15 and as he moves away from the approach plane across the paths of the beams the spot of light moves upwards or downwards from the marker lights according as the observer moves above or below the approach plane. The observer's task is to bring the spot of light into register with the marker lights and holds it in that position.

Figure 5 shows schematically, and much exaggeratedly in beam width and inclination to the horizontal, a vertical elevation of the housing 1 mounted on the deck of an aircraft carrier 17 so that the central two projection lenses direct their light beams symmetrically about the approach plane 18. The beam angles might for example be 30 minutes of arc and the progressive shift in the inclinations of the central plane of the beam about 8 minutes of arc. The central two beams are indicated in Figure 5 by way of example.

Figure 6 shows at (*a*) the actual appearance of the central six lenses of the indicator system when the observer is in the approach plane, (*b*) and (*c*) the appearance when the observer is respectively 2 minutes and 4 minutes of arc below the approach plane, and (*d*) and (*e*) the appearance when the observer is respectively 2 minutes and 4 minutes of arc above the approach plane. These six lenses are numbered (*i*) to (*vi*) starting from the lowermost, the illuminated regions are represented by shading, and the position of the approach plane is indicated by the line 18.

Figure 7 shows the variation of light intensity of the individual beams produced by the lens, the intensity being plotted as ordinate against the angle to the horizontal as abscissa, the distributions numbered (*i*) to (*vi*) being produced by the lenses of the same number.

The distributions produced by the individual lenses are all similar, and taking that produced by lens (*i*) as typical, it will be seen to be composed of a steeply rising part AB, a substantially constant intensity part BC, and a steeply falling part CD.

Consider now the observer moving upwards from just below the angle corresponding to A. At A he will just begin to see the upper edge of the virtual image of the slit associated with the lens (*i*) as a horizontal line across the lower part of the lens. As he moves upwards this line across the lens will move upwards and the flashed area of the lens will increase until at B the whole of the lens area will appear flashed. This condition will prevail until the observer reaches C after which the lower edge of the virtual image of the slit will appear as a horizontal line across the lower part of the lens and this will move upwards, with corresponding decrease of the flashed area of the lens, until the angle D is reached, after which the lens will appear unilluminated.

Obviously, the reverse change will take place if the observer moves downwards from D to A.

The overlaps of the distributions result, as will be apparent from Figure 7, in the appearance of a flashed region in several lenses simultaneously, these co-operating, when the observer is at a distance, to give the appearance of a spot of light extending over the length of about two and one half lenses along the line of lenses, as previously mentioned. The ordinate lines marked (*a*), (*b*) (*c*), (*d*), and (*e*) in Figure 7 correspond to the five appearances of the six lenses so indicated in Figure 6, and the general rise (from left to right of the figure) in the total shaded region indicates the apparent movement of the spot of light, which is continued across the other lenses of the system as the angle of view of the observer continues to increase, the reverse movement taking place as the angle of view decreases. The overlaps of the light distributions are arranged to produce a movement of the spot of light which is reasonably smooth and of substantially constant intensity.

It will be appreciated that the arrangement particularly described in which at any time a length of indicator equivalent to about two and one half of the lenses appears to be flashed represents a compromise for this system of twelve lenses between the desirability of having a large number of lenses flashed simultaneously for obtaining increased light intensity and the undesirability of having a spot of light so long as to reduce the sensitivity of the arrangement and make it difficult to centre the spot between the markers.

In other arrangements it may be preferable to arrange for a different number of lenses to appear flashed at any time.

For example by making the slit height 0.094 inch in the arrangement described the spot of light is caused to extend over a length of the indicator equivalent to three lenses, and in other cases a greater or smaller number of lenses may appear to be flashed. If very large aperture lenses are used, none of the lenses may ever appear to be fully flashed, the virtual image extending as a band of light across each lens and moving along the line of lenses so that it begins to appear in the succeeding lens just as it begins to disappear from one of the lenses. Whatever arrangement is used the optical system should (for aircraft deck-landing use as described) be adjusted, in particular by suitable choice of the focal length of the lenses and position of the slits relative to their foci, to ensure that the top and bottom edges of the observed virtual images of the slits move smoothly across the lenses at such a rate that the total flashed area as seen by the observer does not change significantly and the actual height of the flashed area does not vary to such an extent as to detract undesirably from the smoothness of movement of the observed spot of light; in general this height should not vary by more than about 20%. In some cases this may be facilitated by the use of lenses of rectangular aperture.

Figure 8:
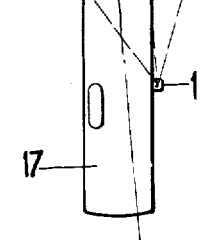

Figure 8 shows a plan view of the aircraft carrier, which is shown as of the angled deck type, the vertical landing plane indicated by 19 being slightly inclined to the line of the deck.

In order that an aircraft approaching the carrier from the bottom right in Figure 8 can pick up the indicating arrangement on circuit preparatory to landing, it is desirable that the beams should be of high intensity in vertical planes inclined to the landing plane, that is to say the vertical plane through the centre of the landing runway, for example over a horizontal angle of about 15° to the landing plane as indicated by the direction marked 20 in Figure 8. It is also desirable that the intensity be high as the pilot commences his approach in the landing plane, at a distance for example of about 4,000 feet. On the other hand the intensity should not be high when the aircraft is close to the landing point or the pilot may be dazzled by the glare at night.

Each of the projection lenses is, therefore, preferably combined with a light spreading element 13 which in horizontal planes directs some of the light preferentially to the circuit side of the landing plane to produce a substantially flat topped light distribution of high intensity on this side, for example over an angle of about 15°, whilst on the other side of the landing plane the light intensity falls rapidly to a lower value within an angle of a few degrees and thereafter decreases more gradually or remains substantially constant up to an angle of, say 25° to this side as indicated by the direction 21 in Figure 8.

Such a distribution is illustrated in Figure 9 in which the intensity I is shown plotted against the horizontal angle away from the landing plane, which corresponds to the ordinate axis.

This distribution can be produced by a three element type of spreader 13 as shown in horizontal section in Figure 10 the horizontal sections being all similar. This spreader has a central part in the form of a cylindrical lens 22 which produces a substantially constant low intensity horizontal spread of light over the whole horizontal region to be covered, flanked on each side by a prismatic element 23, 24 which bends light to the circuit side of the landing plane, the prismatic elements combining to produce a high intensity component of the horizontal light distribution centred at an angle to the landing plane on the circuit side which is just less than half the horizontal angle over which a high light intensity is required on this side.

With the arrangement described we have found the use of 150 watt filament lamps adequate for obtaining a good daylight indication.

We claim:

1. An arrangement for providing an observer approaching a location with a visual indication of his angular position with respect to the location relatively to an approach plane passing through the location, comprising a plurality of light sources extending on both sides of the approach plane along a line transverse to the approach plane and a marker fixed relatively to the line sequence of light sources which is visible to an observer over the whole working region of the arrangement, said light sources being arranged in use of the arrangement to project towards the observer light beams which in planes perpendicular to the approach plane are of relatively narrow beam angles and have the centre lines of the light beams from the two light sources situated one at each end of the line sequence directed away from the approach plane to different sides thereof and the directions of the centre lines of the successive beams along the line sequence changing progressively from one to the next between these two extreme values so that, starting at one end of the line sequence, each beam overlaps at least half but not the whole of the light beam from the next light source in the sequence and so that over the greater part of the working region of the arrangement the observer always sees at least two of the light sources illuminated simultaneously, which illuminated light sources from a compound light source whose centre changes in position relatively to the marker with changes in the angular position of the observer relatively to the approach plane.

2. An arrangement according to claim 1 wherein the light sources are orientated to produce angular displacements between one light beam and the next which are an integral fraction of the beam width, not greater than a half.

3. An arrangement according to claim 1 wherein the marker consists of a number of light sources arranged along a line which is perpendicular to the line sequence of light sources and in the approach plane, each marker source being directed to project towards the observer a beam of light which is visible over the whole working region of the arrangement.

4. An arrangement according to claim 1 wherein the light sources in the line sequence each consists of a narrow band source of light extending parallel to the approach plane and a projection lens system for projecting an image of said narrow band source.

5. An arrangement according to claim 4 wherein each narrow band light source is arranged between the corresponding lens system and its focus so that the projected light beam forms a virtual image the edges of which become visible as the observer approaches the sides of the light beam so that a progressively increasing or decreasing area of the lens appears to be flashed according as the observer is moving towards or away from the centre plane of the beam.

6. An arrangement according to claim 4 wherein each narrow band source of light is produced by a slit in an opaque sheet, an electric lamp, and a condenser arranged to flood the slit with light from the lamp.

7. An arrangement for use in guiding aircraft along the correct angle of descent for landing on the deck of an aircraft carrier, comprising a plurality of similar optical projectors mounted in line sequence in a housing, each projector including a projection lens system, an opaque sheet arranged between the lens system and its focus and carrying a slit which extends perpendicular to the line sequence, lamp mounting means on the side of the sheet remote from the lens and a condenser arranged to flood the slit with light from the lamp, the positions of the slits relatively to the projection lenses changing progressively in the direction of the line sequence so that the centre planes of the light beams produced by the projectors change progressively in the same sense from one light beam to the next and each beam overlaps at least half but not the whole of the next succeeding beam, the slit heights and the displacements of the slits from the foci of the projection lens systems being such that the light beams produced are of narrow beam angle in planes perpendicular to the length of the slits and the total lens area which appears to be flashed by the virtual images formed by the light beams when the arrangement is viewed by an observer at a distance remains substantially constant, except at the two sides of the system of beams, as the observer moves across the light beams in planes perpendicular to the slit lengths, and at least one marker light is provided adjacent the centre of the line sequence of projectors which produces a marker light beam covering the whole extent of the system of beams from the projectors.

8. An arrangement according to claim 7 wherein each projection lens system includes a light spreading element arranged to spread the light beam from the projector into a relatively wide angle in planes parallel to the lengths of the slits.

9. An arrangement according to claim 8 wherein each light spreading element is designed to produce a peak in the light intensity distribution to one side, the same for all the projectors, of the beam in said parallel planes with the light itnensity falling off rapidly to a lower and substantially constant value towards the other side of the beam.

10. An arrangement according to claim 7 including twelve projectors each of lens aperture about four inches in diameter and focal length about fourteen inches, with the associated slit of height, the same for each slit, within the range of about 0.076 to 0.094 inch and displaced about 4.5 millimetres from the focus towards the lens, the resulting light beams each being about 30 minutes of arc in angular width in planes parallel to the direction of the line sequence of projectors and the slits being displaced progressively in this direction relatively to the associated lenses to produce an angular displacement of about 8 minutes of arc in the directions of the centre planes of the beams whereby the virtual images seen by the observer over the greater part of the working region of the arrangement flash a total area of from two and a half to three of the lens apertures.

References Cited in the file of this patent

UNITED STATES PATENTS

| 2,497,427 | Weiss | Feb. 14, 1950 |
| 2,634,399 | Stocker | Apr. 7, 1953 |
| 2,784,925 | Goodhart | Mar. 12, 1957 |